No. 795,933. PATENTED AUG. 1, 1905.
W. M. POWER.
GEARING FOR CONVEYANCES.
APPLICATION FILED MAY 31, 1902. RENEWED AUG. 6, 1904.
3 SHEETS—SHEET 2.
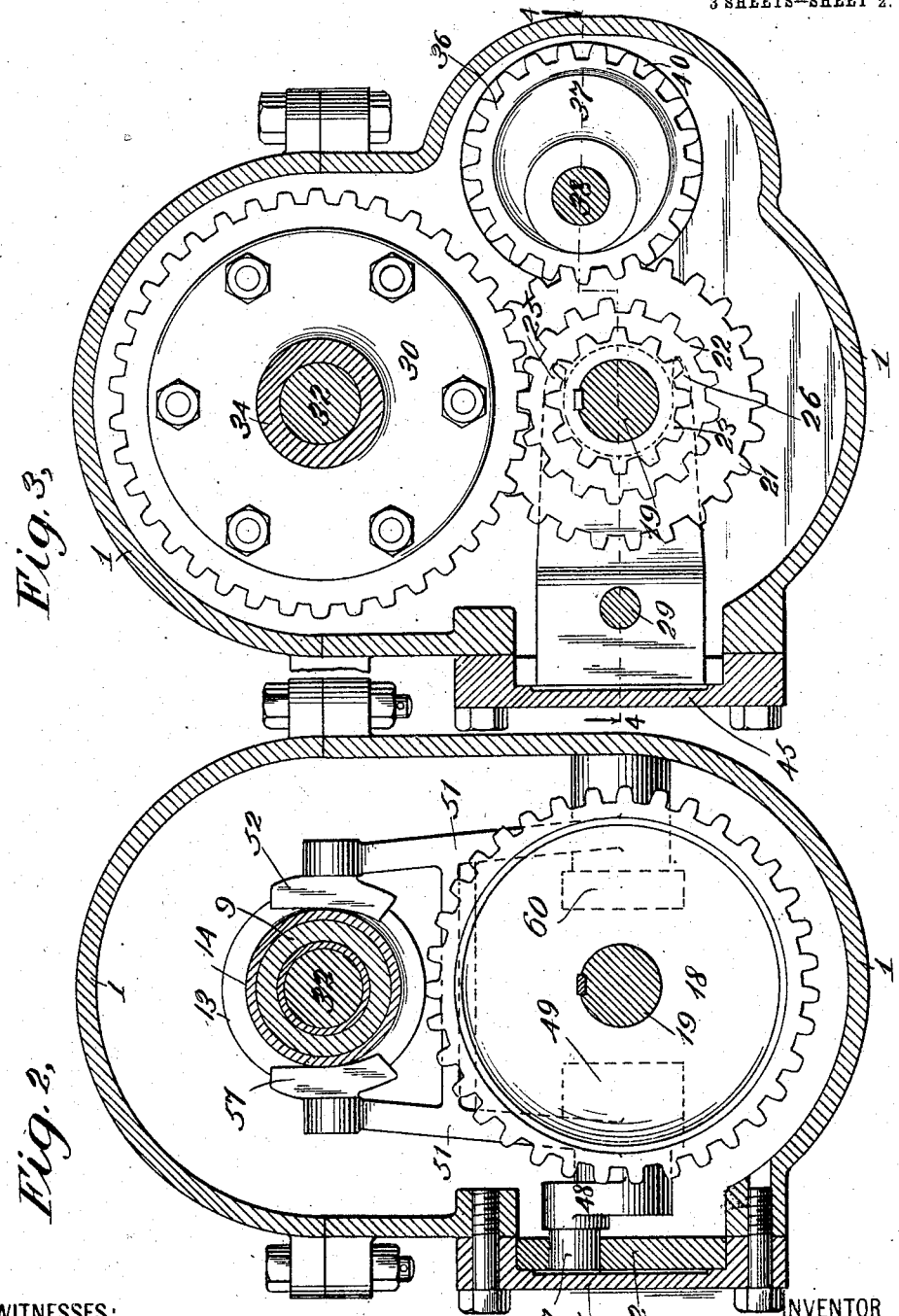
WITNESSES:
INVENTOR
William M Power
BY
Kenyon & Kenyon
ATTORNEY

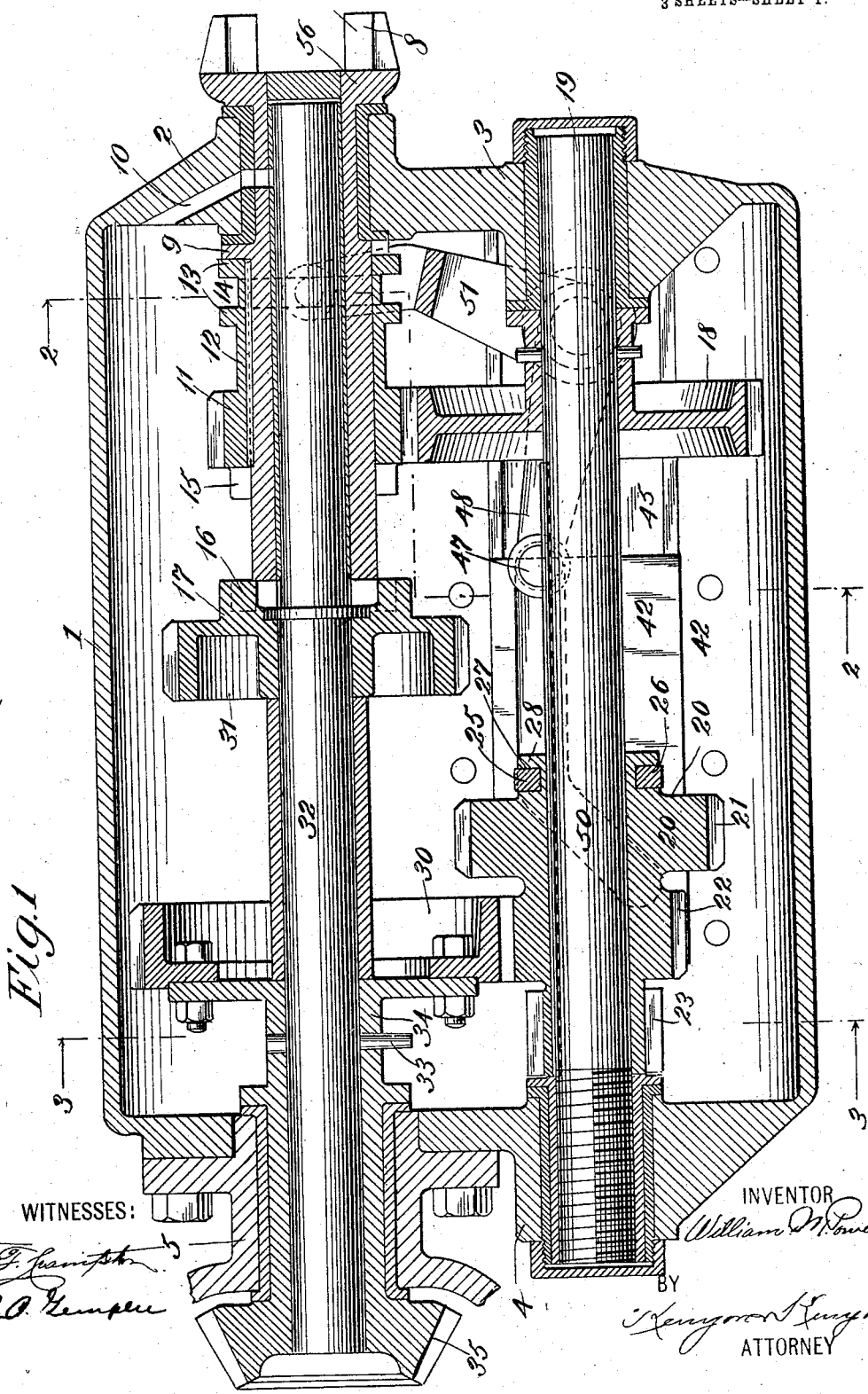

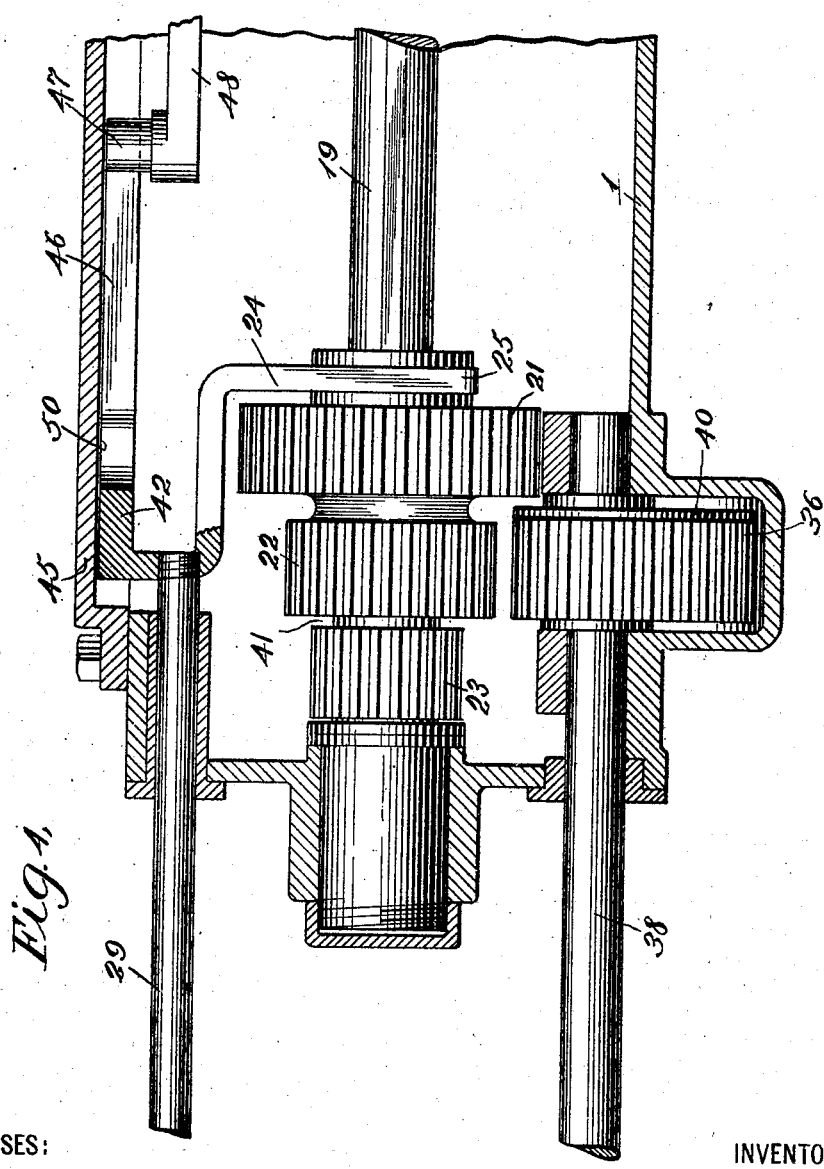

12; # UNITED STATES PATENT OFFICE.

WILLIAM M. POWER, OF RYE, NEW YORK, ASSIGNOR, BY MESNE ASSIGNMENTS, TO ALBERT C. BOSTWICK, OF NEW YORK, N. Y.

GEARING FOR CONVEYANCES.

No. 795,933.     Specification of Letters Patent.     Patented Aug. 1, 1905.

Application filed May 31, 1902. Renewed August 6, 1904. Serial No. 219,780.

*To all whom it may concern:*

Be it known that I, WILLIAM M. POWER, a citizen of the United States, and a resident of Rye, in the county of Westchester and State of New York, have invented new and useful Improvements in Gearing for Conveyances, of which the following is a specification.

My invention relates to gearing; and it has for its object to provide a means for varying the speed of a transporting means, such as an automobile or a boat, and also for reversing the direction of motion of the transporting means.

The invention also has for its object to provide a driving means for operating the shaft of the gearing, mounted in such a way as to support the driven shaft or gearing, and to provide a means for varying the speed of the driven shaft or gearing, as by a step-cone gear, which may be located in different positions relative to the driven gearing, and to provide a means for controlling the gearing.

The invention also consists in various features of construction and combination of parts hereinafter described, and set forth in the claims.

The invention is illustrated in the accompanying drawings, in which the same reference-numerals refer to similar parts of my invention.

Figure 1 illustrates a sectional view through the gearing and the supporting-casing therefor. Fig. 2 is a sectional view of the casing and taken on the line 2 2, Fig. 1. Fig. 3 illustrates a sectional view taken on the line 3 3, Fig. 1. Fig. 4 illustrates a sectional view of the casing, taken on the line 4 4 of Fig. 3.

In Fig. 1, 1 indicates a casing for the gearing and having bearing for supporting the same. 2 indicates the bearing for the driving means. 3 and 4 indicate the bearing for the counter-shaft. 5 indicates the bearing for the driven shaft. The driving means 56 consists of a sleeve which is directly or indirectly connected with the engine or motor by means of the positive clutch 8, supported on one end of the driving-sleeve. This sleeve is mounted on the bearing 2 of the casing 1 and has a flange 9 located on the inner side of the bearing 2 to prevent any lateral movement of the sleeve. An oil-hole 10 is provided for oiling the bearing of this sleeve and also for oiling the driven shaft which is located within the driving-sleeve 56. The driving-sleeve carries a gear 11, which is splined on the sleeve. The gear 11 has a sleeve 12, which has two shoulders 13 at one end. The shoulders 13 form a slot 14, in which are located a pair of pivoted ears which are adapted to shift the driving-gear 11 along the driving-sleeve. The driving-gear 11 also forms part of a positive clutch having projecting lugs 15, adapted to enter the holes 16 of the counterpart of the clutch 17. The counterpart on the clutch is located upon the driven shaft. This provides a means for direct connection between the driving means and the driving-shaft. Gear 11 is adapted to mesh with a gear-wheel 18, located upon the counter-shaft 19. The gear 18 is keyed to the shaft 19 and turns it. It is so located relative to the end of the shaft as to butt against the bearing 3 of the casing and prevent lateral movement of the shaft 19. At the other end of the shaft is located a means for varying the speed of the driven shaft. This means consists of a step-cone gear 20, having a plurality of steps 21, 22, and 23, which are adapted to mesh with the gear-wheels located upon the driven shaft. The cone 20 is splined to the shaft 19, and a means is provided for shifting the cone 20 along the shaft to different positions relative to the gearing located upon the driven shaft. The means for shifting the cone consists of a yoke 24. (Shown in Fig. 4.) The yoke 24 has two arms 25 and 26, which are adapted to register with a slot 27, formed by a collar 28 and the gear 21. The yoke 24 is connected to a manual means by a rod 29 for shifting the cone 20. The cone 20 is connected to the driven shaft by the gears 30 and 31, which are located upon the driven shaft 32. When the cone is in one position, the step 22 of the cone 20 meshes with the gear 30 on the driven shaft. When the cone is in another position, the step 21 meshes with the gear 31. The gear-wheels being of different sizes, varying speeds are produced in the driven shaft. The gear-wheel 30 is connected to the shaft 32 by the key 33. The gear has a sleeve 34, which forms a bearing for supporting the driven shaft. At the outer end of the sleeve 34 is located the bevel-gear 35, which is adapted to operate upon the bevel-gear of the driving-shaft of the automobile or transporting means. Gear 31 is also connected to the shaft 32. Gear 31 also carries the counterpart 17 of the clutch, whereby the driven shaft 32 and the driven sleeve 56 are connected together.

For reversing the direction of the motion of the automobile or other conveyance I have provided an idle gear, which is adapted to mesh with the gearing on the counter-shaft and gearing on the driven shaft. The idle gear is illustrated in Figs. 3 and 4 and is marked 36. It is carried by a concentric bearing 37, which is fixed eccentrically to the shaft 38. The shaft 38 is connected with a manual means, which causes the shaft to revolve, and thus throw the gear 36 into mesh with the step-cone gear and with gearing located upon the driven shaft. When the cone-gear is located in such a position that its step-cone 23 is under the gear 36, the cone is in such a position that none of the steps will be connected with any of the gears of the driven shaft and also in such position that the idle gear 36 will mesh with the step 23 and also mesh with the gear 30. The operation of the shaft and the gearing will then be such as to reverse the direction of the driven shaft.

To prevent the shifting of the step-cone gear 20 while the idle gear at 36 is in mesh therewith, I have provided the idle gear 36 with a shroud 40, which is adapted to register with a slot 41, formed between the two steps 22 23 of the cone 20.

In order to adjust the parts just described properly, I have provided a means for shifting the gearing at the proper time and the proper distances to produce the desired changes in the speed of the conveyance. This means consists of a cam-plate, a yoke, and a bell-crank having one arm formed into a second yoke. The cam-plate 42 is supported in a plate 45, having bearings which guide the plate 42 in its movement back and forth. The cam-plate carries the yoke 24, which operates on the cone-gear to shift it as the plate is moved. The cam-plate has an angular slot 46, which operates on a cam-bearing 47, located upon the arm 48 of a bell-crank. The slot has a main portion 49 and a part 50 located at substantially forty-five degrees thereto. The part 49 is of sufficient length to allow the cone 20 to take different positions relative to the driving-gear without operating upon the bell-crank. In these different positions of the step-cone gear 20 different speeds may be produced in the driven shaft, the meshing of the different gears, and also the driven shaft may be reversed in its direction of motion. When, however, the part 50 of the slot comes into position to operate upon the cam-bearing 47, the arm 48 is moved downward and the arm 51 of the bell-crank, with gear 11, is moved forward. This movement of the gear 11 disconnects it with the gear 18 of the counter-shaft and connects the two parts of the positive clutch 15 16. The driven shaft is then directly connected with the driving means.

The bell-crank for moving the driving-gear 11 is pivoted upon the casing in the bearings 49 and 60. One arm of the bell-crank is formed into a yoke. The upper end of the yoke has a pair of pivoted ears 52 57, which are adapted to register with the slot 14, located upon the sleeve 12 of the driving-gear. The pivoted ears 52 57 permit of the axial displacement of the sleeve and gear and also the revolution of the gear.

The operation of my device is as follows: If it is desired that the slowest forward speed should be given to the conveyance, the parts of the gearing are located in the position shown in Fig. 1, wherein the driving-gear 11 meshes with the gear 18 and the step 22 of the cone 20 meshes with the gear 30. This produces a forward movement of the conveyance. If an increased forward speed is desired to be given to the conveyance, the cam-plate 42, with the yoke 24, is moved to the right, as shown in Fig. 1, by the rod 29 until the step 21 meshes with the gear 31. The connection of the gearing will then be from the driving-gear 11 to the gear 18 on the counter-shaft to the gear 21, then to the gear 31, which is keyed to the driven shaft 32. If it is desired to vary the speed of the conveyance, more steps may be connected to the step-cone gear 20 and more gears may be placed upon the driven shaft 32, and these steps and gears may be caused to mesh together. The greatest speed is obtained by directly connecting the driving means with the driven shaft 32. This is done by the operation of the cam-plate 42 coming in such a position that the part 50 of the slot operates upon the cam-roller 47 and causes the yoke 51 to swing forward, which in turn shifts the gearing 11 and causes the clutch to connect the driving-sleeve with the driven shaft. The gearing 18 will then be entirely disconnected. The step-cone gear will be entirely disconnected from any of the gears of the driven shaft 32. The driving means will then directly operate on the driven shaft. If it is desired to reverse the direction of the motion of the conveyance, the step-cone gear is so positioned that the step 23 will be in line with the gear 30 on the driven shaft and the idle gear 36. The idle gear 36 is then swung into mesh by turning the rod 38, which carries the eccentric bearing 37. The connection of the gearing will then be from the driving means to the driving-gear 11, the gear 18, located on the counter-shaft, the step 23 of the cone-gear 20 to the idle gear 36 to the gear 30, located on the driven shaft, which will cause the driven shaft to move in the reverse direction.

What I claim, and desire to secure by Letters Patent, is as follows—

1. In a gearing mechanism, the combination of a driving-sleeve, a gear located on the said driving-sleeve, a counter-shaft, a gear adapted to mesh with the said gear on the said driving-sleeve and located on the said counter-shaft, a driven shaft, a step-cone gear also located on the said counter-shaft, gear-wheels located on the driven shaft adapted to be driven by the said step-cone when it is in different positions on the counter-shaft, means for moving the said step-cone gear.

2. In a driving and a reversing mechanism, the combination of a sleeve, a driving-gear mounted on the said sleeve, a counter-shaft, a gear mounted on the said counter-shaft and connected to the said gear on the said sleeve, a driven step-cone gear, a driven shaft supported within the said sleeve and having a plurality of gear-wheels adapted to mesh with the said cone and an idle gear also adapted to mesh with the said cone-gear and with one of the gears located on the said driven shaft.

3. In a gearing mechanism the combination of a driving-gear, a shaft operatively connected to the said driving-gear, a step-cone gear located on the said shaft, a driven shaft, gearing located on the said driven shaft, means for shifting the said cone-gear and the said driving-gear, whereby the said driving-gear may be connected directly to the said driven shaft.

4. In a gearing mechanism the combination of a driving-sleeve, a driving-gear located in the said driving-sleeve, a counter-shaft operated by the said driving-gear, a step-cone gear splined on the said shaft, a means connected to the said cone-gear and the said driving-gear, adapted to shift the said cone-gear along the said counter-shaft and the said driving-gear along the said driving-sleeve, a driven shaft, gearing located on the said driven shaft.

5. In a gearing mechanism, the combination of a driving-sleeve, a gear splined on the said driving-sleeve, a counter-shaft, gearing splined on the said counter-shaft and a gear also located on the said counter-shaft, a driven shaft, gears located on the said driven shaft, a clutch and means for disconnecting the gear located on the said driving-sleeve from the gear located on the said counter-shaft and for closing the said clutch, and means for shifting the said gear.

6. In a gearing mechanism, the combination of a driving-gear, a counter-shaft, a gear mounted on the said counter-shaft, a step-cone gear splined on the counter-shaft, a driven shaft, gearing mounted on the said driven shaft, a means for disconnecting the driving-gear from the gear located on the counter-shaft and the step-cone gear from the gearing located on the driven shaft.

7. In a gearing mechanism, the combination of a driving-sleeve, a gear splined on the said driving-sleeve and carrying a clutch member, a counter-shaft, a gear mounted on the said counter-shaft and adapted to mesh with the gear located on the driving-sleeve, a cone-gear splined on the said counter-shaft, a driven shaft carrying a second clutch member, a plurality of gears located on the said driven shaft, adapted to mesh with the said cone-gear when the said cone-gear is in different positions on the said counter-shaft, a means for shifting the gear located on the driving-sleeve so as to disconnect it from the gear located on the counter-shaft and to shift the said cone-gear.

8. In a gearing mechanism, the combination of a driving-sleeve, a gear splined on the said driving-sleeve, a counter-shaft, a gear mounted on the said counter-shaft and adapted to mesh with the gear located on the said driving-sleeve, a step-cone gear splined on the said counter-shaft, a driven shaft, a plurality of gears located on the said driven shaft, a clutch for connecting the said driven sleeve with the said driven shaft, and means for shifting the said splined gears and operating the said clutch.

9. In a gearing mechanism, the combination of a driving-gear carrying a clutch member, a counter-shaft, gear-wheels located on the said counter-shaft, one of said gear-wheels adapted to mesh with the driving-gear, a driven shaft, a plurality of gears mounted on the said driven shaft and adapted to coöperate with the remaining gears located on the counter-shaft, the other member of the said clutch carried by the said driven shaft, and means for disconnecting the parts of the said gearing and operating the clutch.

10. In a gearing mechanism, the combination of a driving gear-wheel movable along its axis, a counter-shaft, a gear mounted on the said counter-shaft and adapted to mesh with the said driving-gear, a step-cone gear splined on the counter-shaft, a driven shaft, a clutch for connecting the said driven shaft with the said driving-gear, a plurality of gears mounted on the said driven shaft, means for shifting the said step-cone to different positions on the counter-shaft for connecting with the gearing located on the said driven shaft and a means for operating the said clutch.

11. In a gearing mechanism, the combination of a driving-gear movable along its axis, a counter-shaft, a gear mounted on the counter-shaft adapted to mesh with the said driving-gear, a step-cone splined on the said counter-shaft, a driven shaft, gears mounted on the said driven shaft, a cam-plate connected to the said step-cone gear and to the said driving-gear, means for operating the said cam-plate, whereby the said gearing will be disconnected.

12. In a gearing mechanism, the combination of a driving-sleeve, a gear splined on the said driving-sleeve, a counter-shaft, a plurality of gears mounted on the said counter-shaft, one of said gears adapted to mesh with the gear mounted on the said driving-sleeve, a driven shaft, a plurality of gears mounted on the said driven shaft adapted to mesh with the remaining gears mounted on the counter-shaft, a cam-plate connected to said remaining gears on the counter-shaft and to the gear mounted on the driving-sleeve, and means for operating the said cam-plate whereby the gearing will be disconnected.

13. In a gearing mechanism, the combination of a gear, a yoke adapted to axially move the said gear, a counter-shaft, gearing mounted on the said counter-shaft and connected to the said gear, a driven shaft, gearing mounted on the said driven shaft and adapted to be operated by the gearing mounted on the counter-shaft, a cam-plate adapted to axially move the gearing of the said counter-shaft and to operate the said yoke.

14. In a gearing mechanism, the combination of a driving-gear, a clutch member on the said driving-gear, a counter-shaft, a gear-wheel mounted on the said counter-shaft and adapted to mesh with the driving-gear, a step-cone gear also mounted on the said counter-shaft, a driven shaft having a second clutch member, gear-wheels mounted on the said driven shaft, a cam-plate connected to the said step-cone gear and to the said driving-gear and adapted to shift the said step-cone gear and driving-gear to different positions.

15. In a gearing mechanism, the combination of a driving-gear, a counter-shaft, a plurality of gears located on the said counter-shaft, one of said gears meshing with the said driving-gear, a driven shaft, a gear located on the said driven shaft and adapted to mesh with one of the remaining gears of the said counter-shaft, an idle gear adapted to mesh with another of said remaining gears on the counter-shaft and with the gear located on the driven shaft, a cam-plate for shifting certain of the said gears of the counter-shaft.

16. In a gearing mechanism, the combination of a driving-gear, a counter-shaft, a gear mounted on said counter-shaft adapted to mesh with the said driving-gear, a step-cone gear, a driven shaft, a plurality of gears mounted on the said driven shaft, and means for shifting the step-cone gear so as to mesh with each one of the gears located on the driven shaft and for disconnecting the said driving-gear and the said gear mounted on the counter-shaft.

17. In a gearing mechanism, the combination of a counter-shaft, a gear-wheel mounted on the said counter-shaft, a step-cone gear splined on the said counter-shaft, a driven shaft, a plurality of gears located on the said driven shaft, an idle gear, and means for shifting the said step-cone gear, so as to mesh with each one of the gears located on the driven shaft and to mesh with the idle gear, whereby varying speeds may be given to the said driven shaft and the said driven shaft may be turned in a reversed direction.

18. In a gearing mechanism, the combination of a driving-sleeve, a gear splined on the said driving-sleeve, a yoke for axially moving the said driving-gear, a counter-shaft, a gear mounted on the said counter-shaft, a step-cone gear splined on the said counter-shaft, a driven shaft, a plurality of gears mounted on the said driven shaft, an idle gear adapted to mesh with one of the steps of the cone-gear and with one of the gears of the said driven shaft, a clutch carried by the gear mounted on the said driving-sleeve for connecting the said sleeve with the said driven shaft, and means for shifting the said cone-gear to mesh with each of the gears located on the driven shaft and with the idle gear and for disconnecting the gear located on the driving-sleeve from the gear located on the counter-shaft and closing the said clutch, whereby varying speeds may be given to the said driven shaft and the said driven shaft may be turned into a reversed direction.

19. In a gearing mechanism, the combination of a driving-shaft, a gear located on the said driving-shaft, a counter-shaft, a gear adapted to mesh with the said gear on the said driving-shaft and located on the said counter-shaft, a driven shaft, a step-cone gear also located on the said counter-shaft, gear-wheels located on the driven shaft adapted to be driven by the said step-cone when it is in different positions on the counter-shaft, means for moving the said step-cone gear.

20. In a gearing mechanism the combination of a driving-shaft, a driving-gear located on the said driving-shaft, a counter-shaft operated by the said driving-gear, a step-cone gear splined on the said shaft, a means connected to the said cone-gear and the said driving-gear, adapted to shift the said cone-gear along the said counter-shaft and the said driving-gear along the said driving-shaft, a driven shaft, gearing located on the said driven shaft.

21. In a gearing mechanism, the combination of a driving-shaft, a gear splined on the said driving-shaft and carrying a clutch member, a counter-shaft, a gear mounted on the said counter-shaft and adapted to mesh with the gear located on the driving-shaft, a cone-gear splined on the said counter-shaft, a driven shaft carrying a second clutch member, a plurality of gears located on the said driven shaft, adapted to mesh with the said cone-gear when the said cone-gear is in different positions on the said counter-shaft, a means for shifting the gear located on the driving-shaft so as to disconnect it from the gear located on the counter-shaft, and to shift the cone-gear.

22. In a gearing mechanism, the combination of a driving-shaft, a gear splined on the said driving-shaft, a counter-shaft, a gear mounted on the said counter-shaft and adapted to mesh with the gear located on the said driving-shaft, a step-cone gear splined on the said counter-shaft, a driven shaft, a plurality of gears located on the said driven shaft, a clutch for connecting the said driving-shaft with the said driven shaft, and means for shifting the said splined gears and operating the said clutch.

23. In a gearing mechanism, the combination of a driving-shaft, a gear splined on the said driving-shaft, a counter-shaft, gearing splined on the said counter-shaft, and a gear also located on the said counter-shaft, a driven shaft, gears located on the said driven shaft, a clutch and means for disconnecting the gear located on the said driving-shaft from the gear located on the said counter-shaft and for closing the said clutch, and means for shifting the said gear.

In testimony whereof I have signed my name to this specification in the presence of two subscribing witnesses.

WILLIAM M. POWER.

Witnesses:
   EDWIN SEGER,
   JOHN O. SEMPLER.